United States Patent [19]

Kawasaki et al.

[11] 4,099,885

[45] Jul. 11, 1978

[54] DIGITAL DISPLAY CIRCUIT FOR CAMERA EXPOSURE METER

[75] Inventors: Masahiro Kawasaki, Tokyo; Eiichi Tano, Asaka, both of Japan

[73] Assignee: Asahi Kogaku Kogyo Kabushiki Kaisha, Tokyo, Japan

[21] Appl. No.: 741,435

[22] Filed: Nov. 12, 1976

[30] Foreign Application Priority Data

Nov. 14, 1976 [JP] Japan .............................. 51-136926

[51] Int. Cl.² .......................... G01J 1/42; G01R 17/06
[52] U.S. Cl. .................................. 356/223; 324/99 D; 324/111; 354/24
[58] Field of Search ................... 324/99 D, 99 R, 111; 328/145; 307/297; 356/223, 227; 354/24, 23 D

[56] References Cited

U.S. PATENT DOCUMENTS

| 2,582,831 | 1/1952 | Hester ................................. 328/145 |
| 2,836,356 | 5/1958 | Forrest et al. ..................... 324/99 D |
| 3,303,493 | 2/1967 | Charbonnier .................... 324/99 D |
| 3,700,934 | 10/1972 | Swain ................................. 307/297 |
| 3,760,272 | 9/1973 | Battes ................................ 324/111 |

*Primary Examiner*—Rudolph V. Rolinec
*Assistant Examiner*—Ernest F. Karlsen
*Attorney, Agent, or Firm*—Sughrue, Rothwell, Mion, Zinn and Macpeak

[57] ABSTRACT

A digital exposure meter display circuit for a camera includes a first oscillator 1 whose output controls the charging of an integrating capacitor 28 from a constant current source 3. When the capacitor charge reaches the level of a reference voltage from source 7, as detected by a first comparator 6, a counter 10 is enabled and begins to register clock pulses from a second oscillator 8 through an AND gate 31. When the capacitor charge subsequently reaches the output level of a light measuring circuit 4, which is proportional to the apex value of the sensed object brightness, a second comparator 5 disables the AND gate and enables an LED display 12 supplied with the decoded counter value.

2 Claims, 5 Drawing Figures

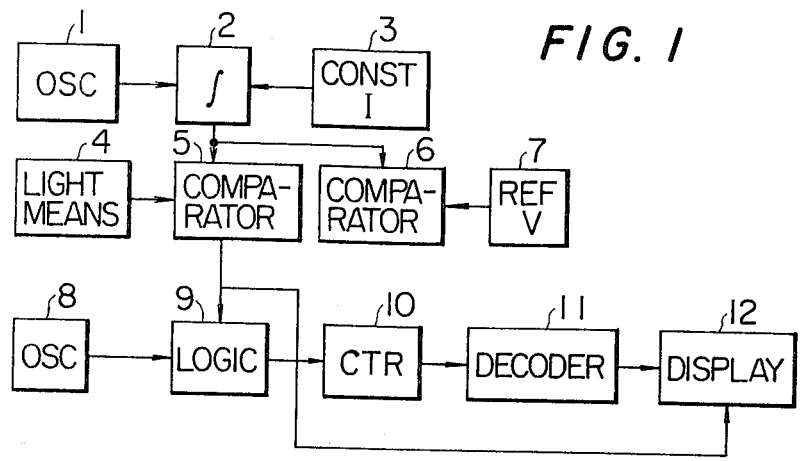
FIG. 1
FIG. 2
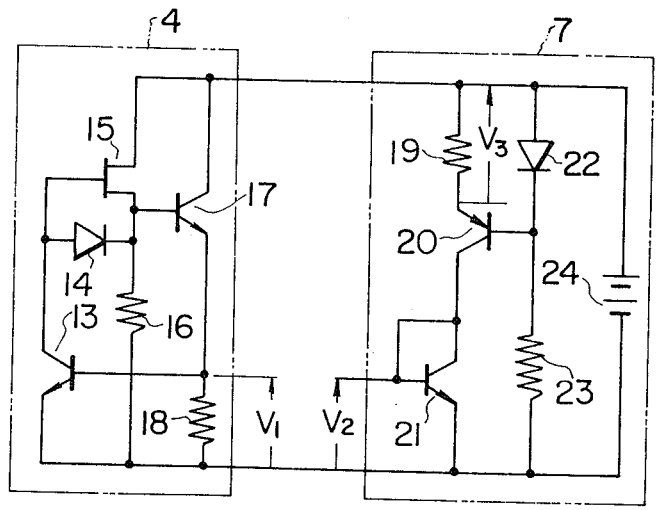
FIG. 5
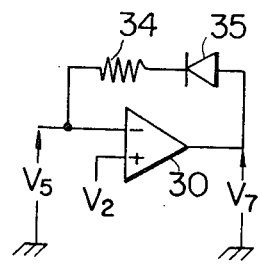

DIGITAL DISPLAY CIRCUIT FOR CAMERA EXPOSURE METER

BACKGROUND OF THE INVENTION

This invention relates to a digital display circuit for a camera exposure meter.

Ammeters have been extensively employed in the prior art as output indicators in photographic exposure meters. Instruments of this type are very prone to vibration damage, however, and have a low dependability factor. Thus, instruments such as ammeters have too many disadvantages to be successfully employed as output indicators in portable devices, such as exposure meters. In order to overcome this difficulty, the present trend in the industry is to employ light emitting diodes or lamps to display photographic information in a digital mode. However, extremely complex and intricate circuits have been required in order to convert analog photographic information into digital output data.

SUMMARY OF THE INVENTION

These drawbacks and disadvantages of the prior art are handily and expeditiously overcome by the present invention in which, briefly, a digital exposure meter display circuit for a camera includes a first oscillator whose output controls the charging of an integrating capacitor from a constant current source. When the capacitor charge reaches the level of a reference voltage, as detected by a first comparator, a counter is enabled and begins to register clock pulses from a second oscillator through an AND gate. When the capacitor charge subsequently reaches the output level of a light measuring circuit, which is proportional to the apex value of the sensed object brightness, a second comparator disables the AND gate and enables an LED display supplied with the decoded counter value.

BRIEF DESCRIPTION OF THE DRAWINGS

In the drawings:

FIG. 1 shows a block diagram of a digital display system according to this invention, FIG. 2 shows a schematic circuit diagram of the light measuring circuit 4 and reference voltage circuit 7 shown in FIG. 1, FIG. 5 shows a schematic diagram of additional circuit elements which may be added to the circuit in FIG. 3.

DETAILED DESCRIPTION OF THE PREFERRED EMBODIMENTS

Figure 3:
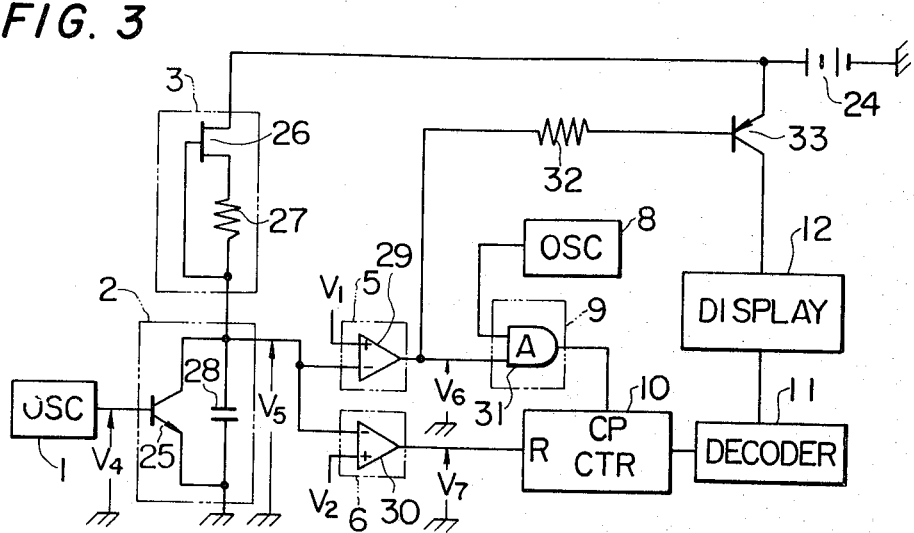
FIG. 3 shows a schematic circuit diagram, partly in block form, of the integration circuit 2, constant current source 3, comparators 5 and 6, and logic circuit 9 shown in FIG. 1.

Referring to the drawings, FIG. 1 shows a first oscillator 1 for repeatedly generating pulses to control the charging operation of an integration circuit 2 by a constant current source 3. The outputs of a light measuring circuit 4 and a reference voltage circuit 7 are compared with the output voltage of the integration circuit 2 by comparators 5 and 6, respectively. A second oscillator 8 generates clock pulses which are applied, under the control of a logic circuit 9 responsive to the output of the comparator 5, to a counter 10. The output of the comparator 6 is applied to the reset terminal of the counter 10, while the counter output is connected to a decoder circuit 11 which drives a light emitting diode display 12.

In operation, when the output of the integration circuit 2 increases to the level of the reference voltage supplied by circuit 7, under the control of the repetitive pulses generated by the first oscillator 1, the reset terminal of the counter 10 is released by the comparator 6, whereupon the counter 10 begins to register the clock pulses generated by the second oscillator 8. When the output of the integration circuit 2 subsequently reaches the output level of the light measuring circuit 4, the comparator 5, acting through the logic circuit 9, terminates the application of clock pulses to the counter 10. The contents of the counter 10 are applied to the decoder circuit 11 to drive the light emitting diode display 12. The number of clock pulses counted before the output of the integration circuit 2 reaches the output of the light measuring circuit 4 represents the digital equivalent of a photographic parameter.

FIG. 2 shows the light measuring circuit 4 and the reference voltage circuit 7. Reference numeral 13 designates a logarithmic compression transistor. The gate of a field-effect transistor 15, having a self-biasing circuit including a photo diode 14 and a resistor 16, is connected to the collector of transistor 13. The base of a transistor 17, connected in an emitter follower mode with a resistor 18, is connected to the source of the field-effect transistor 15, and the emitter of transistor 17 is connected to the base of transistor 13.

A light emitting diode 22 is connected in parallel with a power supply 24 through a resistor 23, while the base of a transistor 20 is connected to the cathode of the diode 22. A resistor 19 and a diode-coupled transistor 21 are connected to the emitter and the collector of transistor 20, respectively.

In operation, by reason of the feedback effected from the collector to the base of transistor 13, which is driven in a constant current mode by the photoelectric current $i_p$ of the photo diode 14, through the field-effect transistor 15 and the transistor 17, the base-emitter voltage $V_1$ of transistor 13 is given by:

$$V_1 = \frac{KT}{q} \ln \frac{i_p}{i_o} + V_{BE(i_o)}, \tag{1}$$

where:

$K$ is a Boltzmann constant,
$T$ is the absolute temperature,
$q$ is the electron charge, and
$V_{BE(i_o)}$ is the base-emitter voltage with a collector current of $i_o$.

Turning now to the reference voltage circuit 7, if it is assumed that the voltage across the resistor 19 is $V_3$ and the resistance thereof is $R_1$, then the collector current $i_1$ of transistor 20 is:

$$i_1 = \frac{V_3}{R_1} \tag{2}$$

Further, the base-emitter voltage $V_2$ of transistor 21, the emitter of which receives the collector current $i_1$, is:

$$V_2 = \frac{KT}{q} \ln \frac{i_1}{i_o} + V_{BE(i_o)} \tag{3}$$

The voltage $V_3$ across resistor 19 is equal to the difference (about 0.8V) between the forward voltage (about 1.4V) of the light emitting diode 22 and the base-emitter voltage (about 0.6V) of transistor 20. The forward voltage of the diode 22 has approximately the same temperature dependence as the base-emitter voltage of the transistor 20, and the variation of the forward voltage of the diode with respect to the forward current thereof is on the order of 30 mV for a two-fold change in current. Thus, it is sufficiently small when compared with the abovedescribed difference voltage (about 0.8V) as to be ignored, and it can therefore, be said that the voltage $V_3$ across the resistor 19 is virtually independent of temperature changes.

FIG. 3 shows the integration circuit 2, the constant current source 3, the comparators 5 and 6, and the logic circuit 9 shown in FIG. 1. An integrating capacitor 28 is connected between the collector and emitter of a transistor 25, to the base of which is connected the first oscillator 1. The gate of a field effect transistor 26, which forms a self-biasing circuit with a resistor 27, and the negative or inverting terminals of comparators 29 and 30, are connected to the collector of transistor 25. The base-emitter voltage $V_2$ of transistor 21 (FIG. 2) and the base-emitter voltage $V_1$ of transistor 13 (FIG. 2) are applied to the positive terminals of comparators 30 and 29, respectively. The output of comparator 30 is connected to the reset terminal of counter 10, while the output of comparator 29 and the output of a second oscillator 8 are connected to an AND circuit 31, the output of which is connected to the clock pulse or count terminal of counter 10. The output of counter 10 is connected to a decoder 11 which is adapted to control the cathodes of a light emitting diode display 12. The anodes of the display diodes are connected to the collector of a transistor 33 whose base is controlled by the output of the comparator 29.

Figure 4:
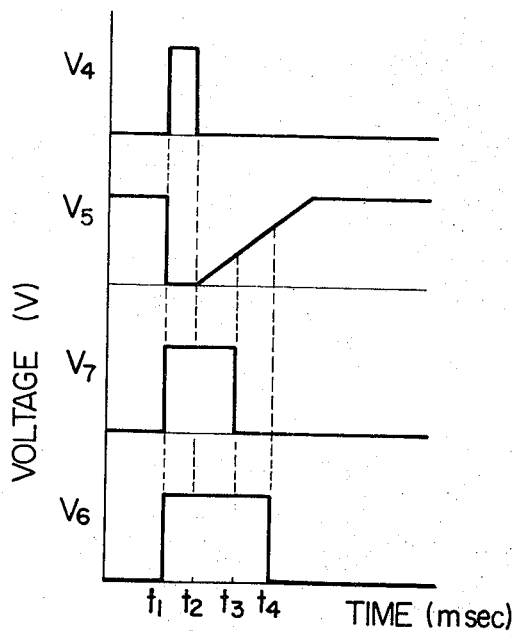
FIG. 4 shows a time chart for describing the operation of the circuit shown in FIG. 3.

The operation of the circuit shown in FIG. 3 will be described with reference to the time chart illustrated in FIG. 4. When the level of a repetitive pulse generated at the output $V_4$ of the first oscillator is raised from a low level (lower than a threshold voltage) to a high level (higher than a threshold voltage) at time $t_1$, the transistor 25 is rendered conductive. This discharges the capacitor 28 and the levels of the output voltages of the comparators 29 and 30 are changed from low to high. When the output $V_4$ drops to a low level at time $t_2$, transistor 25 is rendered non-conductive, and the capacitor 28 begins to charge from the constant current of the field-effect transistor 26. If it is assumed that the gate-source voltage of the field-effect transistor 26 is $V_{GS}$, the resistance of the resistor 27 is $R_2$, and the capacitance of the capacitor 28 is $C_1$, then the voltage $V_5$ of the capacitor at a time $t$ is:

$$V_5 = \frac{V_{GS}}{C_1 R_2} (t - t_2) \tag{4}$$

When the voltage $V_5$ of the capacitor 28 reaches the input voltage $V_2$ of the comparator 30 at time $t_3$, the level of the output voltage $V_7$ of the comparator 30 changes from high to low, and the reset terminal of the counter 10 is released. As a result, the clock pulse output of the second oscillator 8 is applied through the AND circuit 31 to the counter 10. The voltage $V_5'$ of the capacitor 28 obtained when the voltage $V_5$ reaches the input voltage $V_2$ of the comparator 30 is:

$$V_5' = V_2 = \frac{V_{GS}}{C_1 R_2} (t_3 - t_2) \tag{4'}$$

When the voltage of the capacitor 28 increases to the level of the input voltage $V_1$ of the comparator 29, the output of the comparator changes from high to low, and the application of pulses from the second oscillator 8 is disabled by the AND circuit 31. The voltage $V_5''$ of the capacitor 28 obtained when the voltage of the capacitor reaches the input voltage $V_1$ is:

$$V_5'' = V_1 = \frac{V_{GS}}{C_1 R_2} (t_4 - t_2) \tag{5}$$

The period of time T during which the clock pulses are applied to the counter 10, obtained from equations (4') and (5), is:

$$T = t_4 - t_3 = \frac{C_1 R_2}{V_{GS}} (V_1 - V_2) \tag{6}$$

Equation (6) can be rewritten, by substituting in equations (1) and (3), as follows:

$$T = \frac{KT}{q} \frac{C_1 R_2}{V_{GS}} \ln \frac{i_p}{i_1} \tag{7}$$

The photoelectric current $i_p$ with respect to the apex value $B_v$ of the measured brightness of an object to be photographed is:

$$i_p = i_{po} \cdot 2^{B_v} \tag{8}$$

where $i_{po}$ is the photoelectric current when $B_V = 0$. Therefore, equation (7) can be rewritten as follows:

$$T = \frac{KT}{q} \frac{C_1 R_2}{V_{GS}} \ln \left( \frac{i_{po}}{i_1} 2^{B_v} \right) \tag{9}$$

Now if $R_1$ is selected so that $i_1 = i_{po}$ in equation (2), then equation (9) can be rewritten as follows:

$$T = \left( \frac{KT}{q} \frac{C_1 R_2}{V_{GS}} \right) \cdot B_v \cdot \ln 2 \tag{10}$$

If the oscillation period of the second oscillator 8 is $T_o$, then the number of pulses N registered by the counter 10 is:

$$N = \frac{T}{T_o} = \left( \frac{KT}{q} \frac{C_1 R_2}{V_{GS}} \right) \cdot B_V \cdot \frac{(\ln 2)}{T_o} \tag{11}$$

Finally, if $T_o$ in equation (11) is selected to satisfy the following equation:

$$T_o = \frac{KT}{q} \cdot \frac{C_1 R_2}{V_{GS}} \cdot \ln 2, \tag{12}$$

then equation (11) becomes simply: $N = B_v$.

In the interval of time from $t_1$ to $t_4$, during which the output level of the comparator 29 is high (signal $V_6$ in FIG. 4), the transistor 33 is non-conductive and the diode display 12 is extinguished. If the period of time during which the diode display is extinguished is much shorter than the period of the repetitive pulses from the first oscillator 1, the display will appear to continuously emit light, and the measured value of $B_V$ will seem to be constantly displayed. In order to ensure such operation, the period of time during which the diode display is extinguished can be reduced by the additional circuit elements shown in FIG. 5. Thus, if feedback is effected from the output of the comparator 30 through a diode 35 and a resistor 34 to the inverting input of the comparator, the capacitor 28 will be more quickly charged, due to the added output of the comparator, during the period of time from $t_2$ to $t_3$. Therefore, the interval of time between $t_2$ and $t_3$ is shortened, which in turn reduces the high output level duration of signal $V_6$. Furthermore, if a field-effect transistor 26 having a temperature coefficient of $V_{GS} = Y \cdot T$ ($Y$ = constant V/°C) is used, the number of pulses N registered by the counter 10 will be independent of temperature variations

What is claimed is:

1. A digital display circuit for a photographic exposure meter, comprising:
   (a) a constant current source,
   (b) a capacitor coupled to said constant current source,
   (c) a first oscillator for controlling the discharge of said capacitor and the charging thereof from said constant current source,
   (d) a second oscillator,
   (e) a counter,
   (f) a reference voltage source,
   (g) a light measuring circuit for producing an output voltage proportional to the logarithm of the brightness of a photographic object,
   (h) means for enabling the counter to register pulses generated by said second oscillator when the charge on said capacitor reaches said reference voltage wherein said means for enabling comprises a first comparator responsive to the charge on said capacitor and said reference voltage, means for terminating the counter operation when the charge on said capacitor subsequently reaches the output voltage of said light measuring circuit wherein said means for terminating comprises a second comparator responsive to the charge on said capacitor and the output voltage of said light measuring circuit, and wherein the output of said first comparator is connected to a reset input of said counter, and further comprising an AND gate having its inputs connected to the outputs of said second comparator and said second oscillator and its output connected to a count input of said counter,
   (i) means for digitally displaying the number of pulses registered by said counter.

2. A digital display circuit as defined in claim 1, further comprising a unidirectional feedback path connected between the output of said comparator and said capacitor.

* * * * *

UNITED STATES PATENT AND TRADEMARK OFFICE
CERTIFICATE OF CORRECTION

PATENT NO.   : 4,099,885
DATED        : July 11, 1978
INVENTOR(S)  : Masahiro KAWASAKI et al It is certified that error appears in the above-identified patent and that said Letters Patent are hereby corrected as shown below:

IN THE HEADING:

Foreign Application Priority Data:

Delete "Nov. 14, 1976" insert -- Nov. 14, 1975 --

Signed and Sealed this

Second Day of January 1979

[SEAL]

Attest:

RUTH C. MASON
Attesting Officer

DONALD W. BANNER
Commissioner of Patents and Trademarks